(12) United States Patent
Thompson

(10) Patent No.: US 8,357,854 B2
(45) Date of Patent: Jan. 22, 2013

(54) PUSH PLUG SYSTEM AND METHOD

(76) Inventor: Steven L. Thompson, Girard, KS (US)

( * ) Notice: Subject to any disclaimer, the term of this patent is extended or adjusted under 35 U.S.C. 154(b) by 257 days.

(21) Appl. No.: 12/689,977

(22) Filed: Jan. 19, 2010

(65) Prior Publication Data

US 2010/0181728 A1    Jul. 22, 2010

Related U.S. Application Data

(60) Provisional application No. 61/145,300, filed on Jan. 16, 2009.

(51) Int. Cl.
*H02G 15/02* (2006.01)
(52) U.S. Cl. .......................... 174/77 R; 174/93
(58) Field of Classification Search ................ 174/77 R, 174/93, 650
See application file for complete search history.

(56) References Cited

U.S. PATENT DOCUMENTS

| | | | |
|---|---|---|---|
| 3,456,231 A * | 7/1969 | Zimmerman, Jr. et al. ... | 439/532 |
| 4,126,339 A | 11/1978 | Thompson | |
| 4,506,705 A | 3/1985 | Thompson | |
| 4,508,367 A | 4/1985 | Oreopoulos et al. | |
| 4,610,469 A | 9/1986 | Wolff-Mooij | |
| 4,629,269 A * | 12/1986 | Kailus ........................... | 439/587 |
| 4,750,525 A | 6/1988 | Vaughan | |
| 5,048,382 A | 9/1991 | Mitchell | |
| 5,180,197 A | 1/1993 | Thompson | |
| 5,833,276 A | 11/1998 | Thompson | |
| 6,877,530 B2 | 4/2005 | Osborne et al. | |
| 6,957,817 B2 | 10/2005 | Goll | |
| 7,186,929 B2 | 3/2007 | Cox et al. | |
| 7,394,964 B2 | 7/2008 | Tinucci et al. | |

* cited by examiner

*Primary Examiner* — Chau Nguyen
(74) *Attorney, Agent, or Firm* — Law Office of Mark Brown, LLC; Mark E. Brown; Christopher M. DeBacker

(57) ABSTRACT

A push plug designed to interact with and seal an open end of a length of conduit containing a cable. The plug is comprised of a cap, a neck, and a body. The body contains a number of saw-toothed annular ridges. The plug is manufactured from an elastomeric material which allows the plug to be inserted into a conduit opening of a diameter smaller than the diameter of the saw toothed ridges which creates a frictional seal which resists removal of the plug. The plug body further contains passages running longitudinally through the center of the plug. These passages allow cable run through the conduit to be drawn through the plug and inserted through a thin, flexible membrane covering the plug cap.

32 Claims, 17 Drawing Sheets

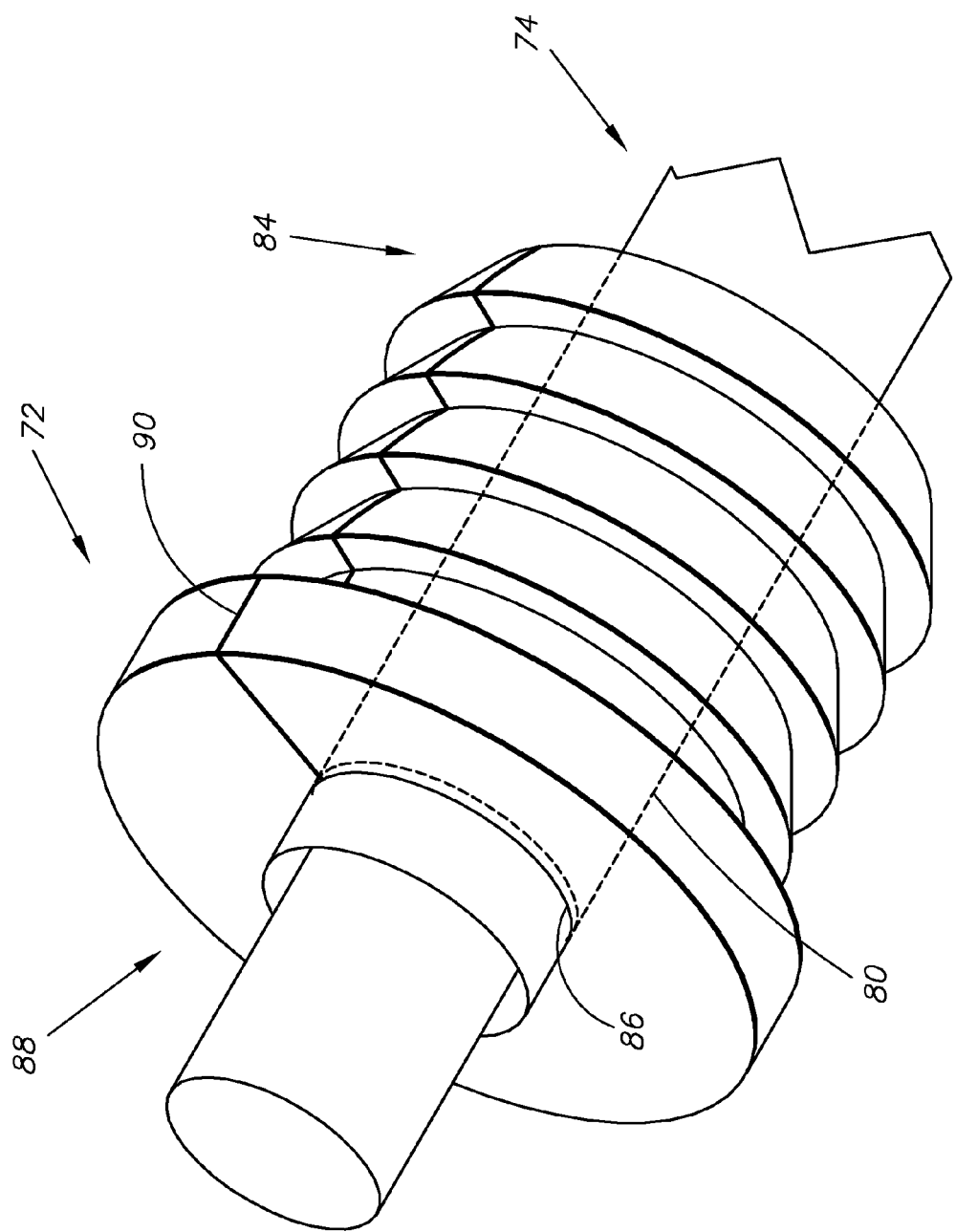

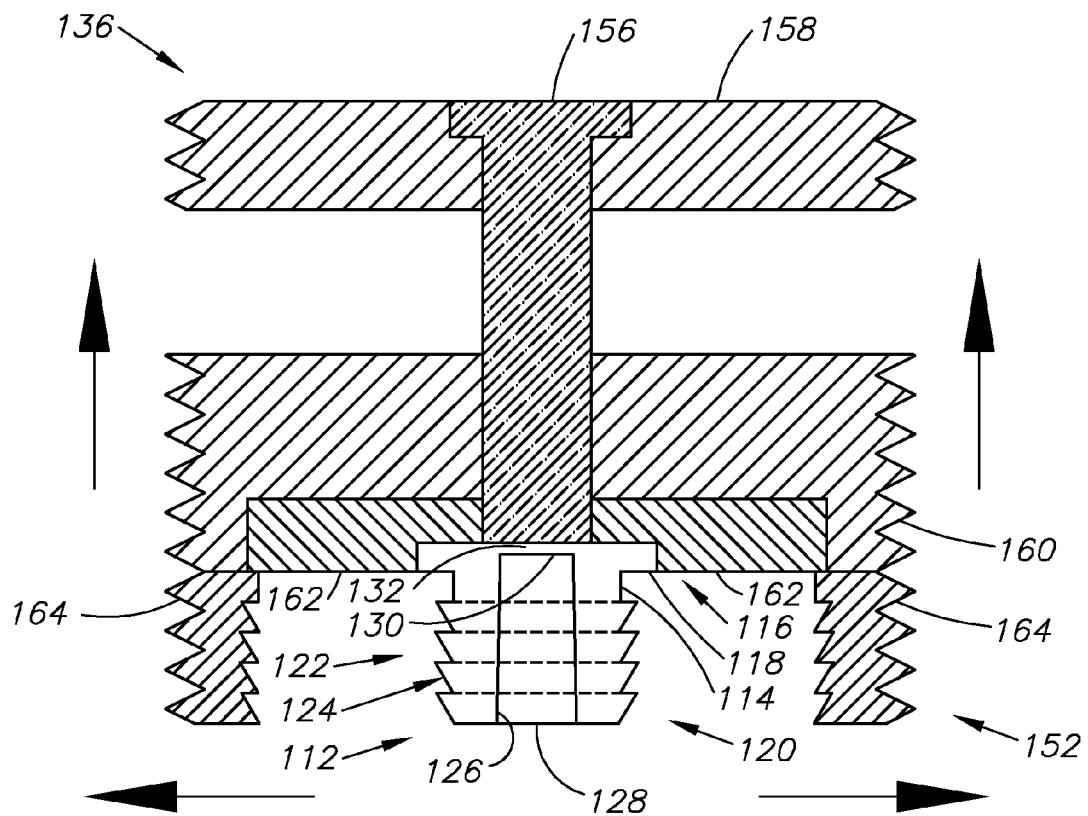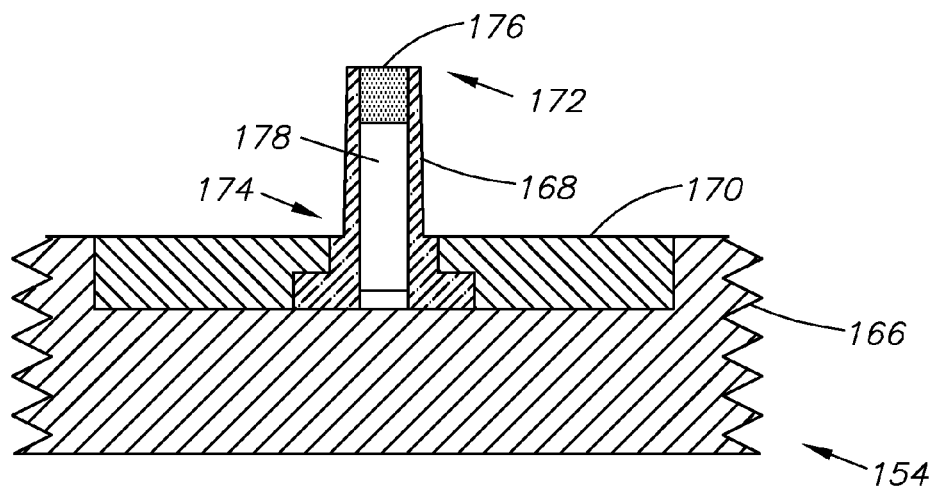
FIG. 12B

PUSH PLUG SYSTEM AND METHOD

CROSS-REFERENCE TO RELATED APPLICATION

This application claims priority in U.S. Provisional Patent Application No. 61/145,300, filed Jan. 16, 2009, which is incorporated herein by reference.

BACKGROUND OF THE INVENTION

1. Field of the Invention

The present invention relates generally to conduit end seals, and in particular a weather-tight plug for sealing cables exiting circular conduits and related applications.

2. Description of the Related Art

Plastic conduits are used to provide protection and ease of installation of telecommunication and electrical cables traveling between service boxes. Conduits used to house such cables are typically circular and manufactured from polyvinyl chloride (PVC) or high density polyethylene (HDPE). The conduits can run great lengths underground and into structures before terminating at a service box.

Cables are typically installed within the conduits after the conduit is buried underground. Cables exist in a variety of sizes and shapes, and are often accompanied by a conducting wire permitting the conduit to be located accurately. Cables are connected to telecommunications equipment by an installer, and the opening at the end of the conduit where the cables exit the conduit is sealed to prevent intrusion by contaminants such as air, water, and animals. Sealing is typically accomplished by encasing the exiting cables within a pliable compound that is capable of adhering to both the cables and the conduit thereby preventing infiltration of contaminants, and maintaining the integrity of the conduit and the cables contained therein.

Existing methods and materials used to seal cables exiting conduits are expensive, time consuming, messy and create difficulty when cables are added to an existing conduit. Conduit openings sealed with expanding spray foam, or clays and potting compounds are messy to apply, and the material is difficult to remove when making adjustments to installed cables, or when adding cables to the conduit. Mechanical plugs having a split gasket, a threaded housing and a threaded nut are difficult to install due to the several parts, and the tendency of the gasket to bunch during installation. A method and materials for sealing conduit is needed that is inexpensive, fast and easy to install, and permits adaptation and installation with new and existing conduits that have added or pre-existing cables.

Heretofore there has not been available a conduit sealing method and materials with the advantages and features of the present invention.

BRIEF SUMMARY OF THE INVENTION

An improved conduit sealing system and method is provided for sealing cables exiting circular conduits. The system includes a monolithic plug manufactured from an elastomeric material having a body at the distal end containing circular sawtooth-shaped ridges, and a circular cap at an opposite, distal end. The plug has one or more passages disposed therein that taper from an opening at the proximal end, and terminate at an enclosure at the distal end comprising a membrane. The membrane consists of the outer layer of the cap and the interior surface of the passage at the distal end. A plurality of passages of varying dimensions may be formed within the plug for receiving cables of corresponding dimension exiting a conduit.

Prior to installation of cables through the conduit, the plug is installed by sliding it into the end of the conduit. Frictional sealing engagement is formed between the sawtooth ridges and the interior of the conduit. The membrane across the distal end allows the plug to create a seal equal to that of a solid plug. After cables are installed the plug is removed, mated with the cable, and reinstalled by sliding the plug back into the end of the conduit. Mating the plug and cable consists of either cutting the membrane above a passage and threading a cable into the plug from the proximal end through the membrane, or cutting through the plug from end to end at a depth sufficient to penetrate a passage and its corresponding membrane, and pushing a cable laterally through the side of the plug into the passage thereby creating a sealing engagement between the cables and plug. After either approach to mating the plug and cable, the plug is slid down the cable into the end of the conduit to make a frictional sealing engagement between the sawtooth ridges and the interior of the conduit, and a sealing engagement between the cap and end of the conduit.

Several modified embodiments of the plug include exemplar quantity, arrangement and sizes of passages for receipt of a multitude of complementary cables having respective openings at a proximal end and a membrane at the distal end.

Manufacture of the single unit plugs is accomplished using a steel forming tool having a first and second half capable of mating in an enclosed sealing arrangement and separating for forming and discharging the plug. The first half of the tool consists of an ejector pin perpendicularly disposed with an ejector plate. The ejector pin is slidably received within a tool base and head insert thereby providing an interior forming surface for molding the cap of the plug. Opposite slide halves are slidably disposed parallel to the tool base for forming the sawtooth-shaped ridges of the plug. The second half consists of one or more core pins for forming the passages within the plug, orientated toward the first half and disposed within a core insert, both of which are disposed within a tool base. Each elongated core pin is substantially hollow and vented to the atmosphere, and has a plug of permeable metal at its tip with a porosity sufficient to permit passage of air but prohibit passages of heated elastomeric material.

Heated elastomeric material is injected under pressure into the closed tool from the core insert and substantially fills the cavity within the tool surrounding the core pin. The air displaced by the injected material is discharged through the core pin through the permeable plug and to the atmosphere thereby permitting complete forming of the plug within the tool and around the core pin creating a circular plug with a cap, sawtooth-shaped ridges, and an open-ended passage with a membrane at one end.

BRIEF DESCRIPTION OF THE DRAWINGS

The drawings constitute a part of this specification and include exemplary embodiments of the present invention illustrating various objects and features thereof. The aspects and features of the drawings are not necessarily to scale relative to each other.

FIG. 8 is an enlarged isometric view of a third alternative embodiment push plug taken generally within circle 8 in FIG. 7.

FIG. 12B is a cross-sectional view of the manufacturing method with the tooling in an open position.

DETAILED DESCRIPTION OF THE PREFERRED EMBODIMENT

I. Introduction and Environment

Figure 1:
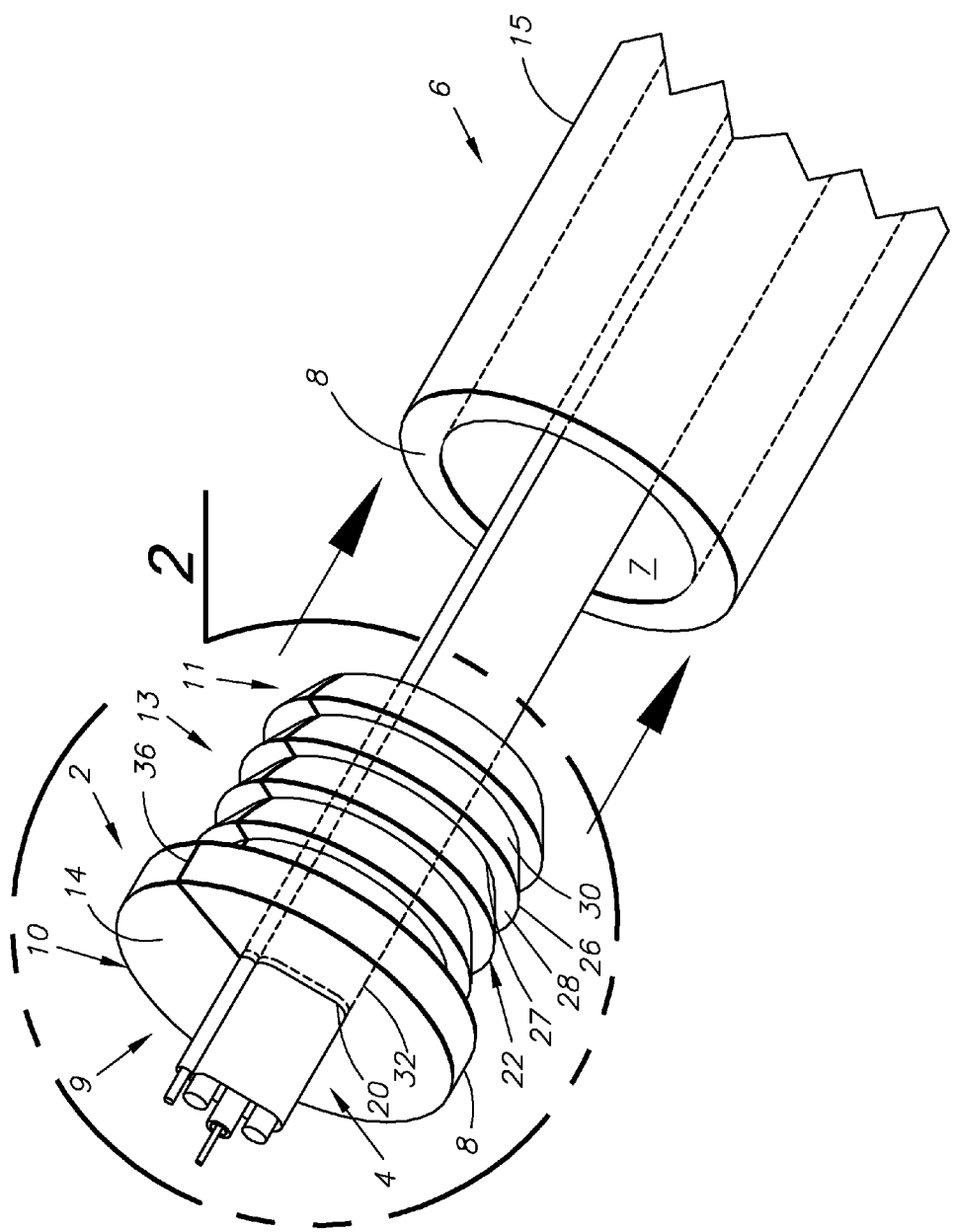
FIG. 1 is an isometric view of a push plug embodying the principles of the present invention.

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

Referring to the drawings in more detail, the reference numeral 2 generally designates a push plug for sealing a cable 4 exiting a conduit 6. Without limitation on the generality of useful applications of the plug 2, it is particularly well suited for use with circular conduits such as fiber optic conduit manufactured with PVC or HDPE. However, the plug 2 can be used with conduits manufactured with different materials and of varying diameters.

II. Preferred Embodiment Push Plug 2

The plug 2 is a single component device generally comprising a neck 12 disposed between a distal end 9 having a cap 10, and a proximal end 11 having a body 13. Without limitation on the generality of useful materials, the plug 2 may be composed of an elastomeric material which includes, but is not limited to rubber, silicone, plastics and urethane, preferably flexible PVC having a hardness of approximately 60 A durometer.

The body 13 includes a plurality of annular, sawtooth-shaped ridges 22 projecting outwardly away from the longitudinal axis 24. Each ridge 22 includes an upper and lower edge 26, 27. The upper edge 26 is formed by the intersection of a distal face 28 lying generally in a plane perpendicular to the longitudinal axis 24, and a proximal face 30 which slopes distally and outwardly to the upper edge 26 from the lower edge 27. The diameter of the ridges 22 is less than the diameter of the cap 10 but greater than the diameter of the inner surface 7 of the conduit 6. The result is a sealing engagement between the plug 2 and conduit 6 due to the frictional and compressive forces exerted by the ridges 22 upon the inner surface 7 of the conduit 6 thereby providing a tight seal against water, air, and animals.

One or more passages 32 extend between an opening 34 at the proximal end 11 and the inner surface 21 of the membrane 20 at the distal end 9 having a proximal inside diameter ID.1 and a lesser, distal inside diameter ID.2. In the exemplary embodiment, the plug 2 has two passages 32 with a distal inside diameter ID.2 dimensioned to securely receive a cable 4 of the ribbon-type for optical fiber. The type, shape, or diameter of the cable 4 that may be used with the plug 2 includes, but is not limited to coaxial cable, multi-core cable, optical fiber cable, ribbon cable for optical fiber, mineral insulated copper-clad cables, and electrical power cables. The quantity, arrangement, and size of the distal inside diameter ID.2 of the passages 32 can vary according to the type and shape of cables used with the plug 2. The distal inside diameter ID.2 of the passage 32 is slightly less than the particular cable 4 that is received therein thereby securely engaging the exterior of the cable 4 as a result of the elastomeric properties of the plug 2.

The cap 10 is generally circular in shape and includes an upper and lower surface 14, 16, bound by an edge 18. The diameter of the cap 10 is substantially equivalent to the diameter of the exterior 15 of the particular conduit 6 used. The upper surface 14 and inner surface 21 define a membrane 20 at the distal end 9 of the plug 2 that is punctured and through which the cable 4 protrudes.

III. Use

Figure 2:
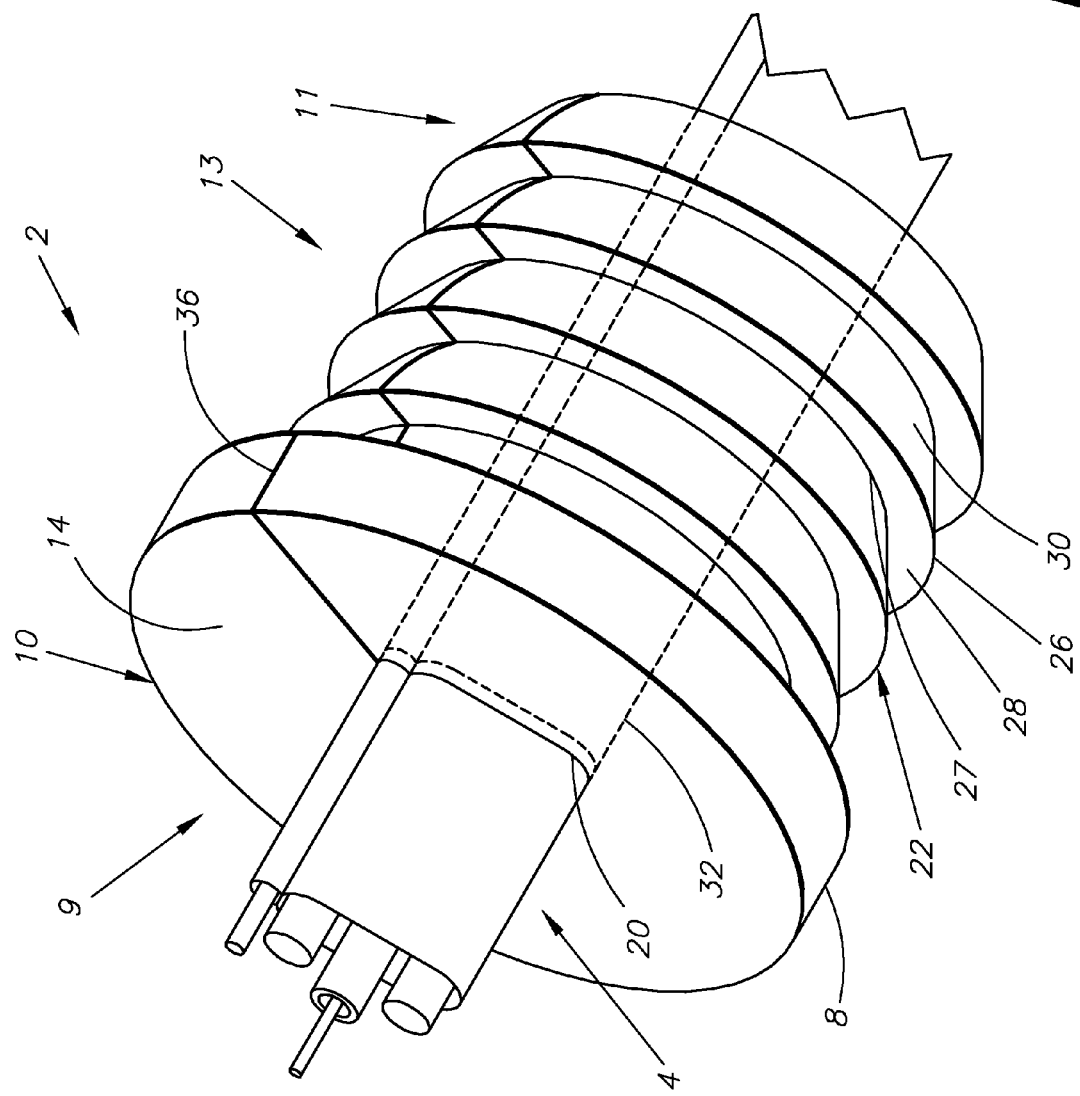
FIG. 2 is an enlarged isometric view of the push plug taken generally within circle 2 in FIG. 1.
Figure 3B:
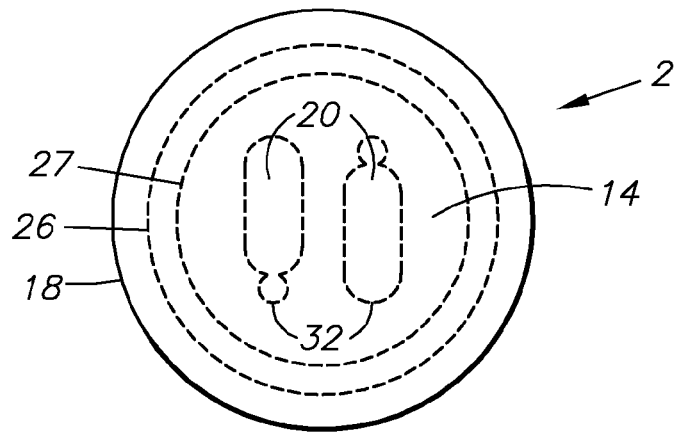
FIG. 3B is a top view of the push plug.
Figure 3A:
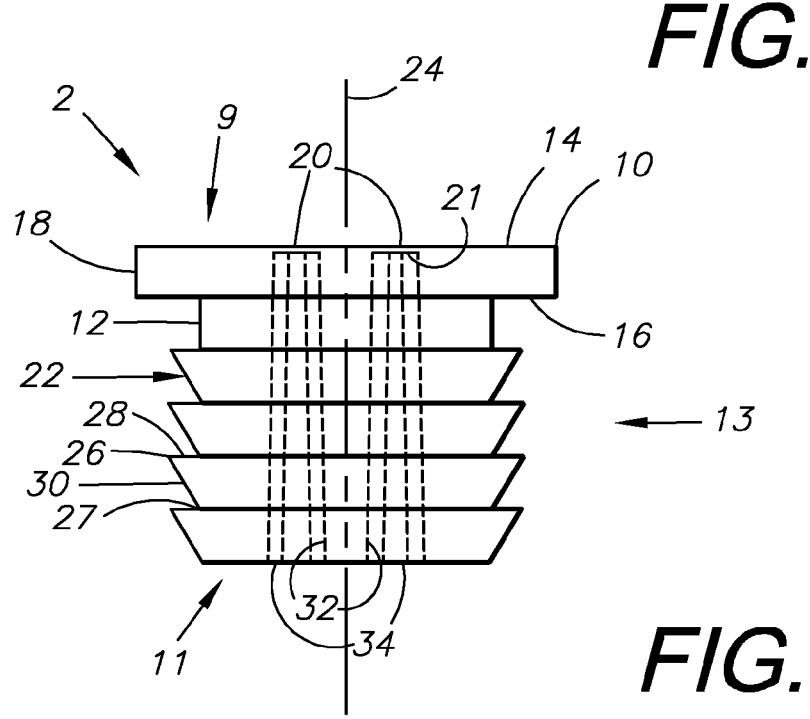
FIG. 3A is a side elevational view of the push plug.
Figure 3C:
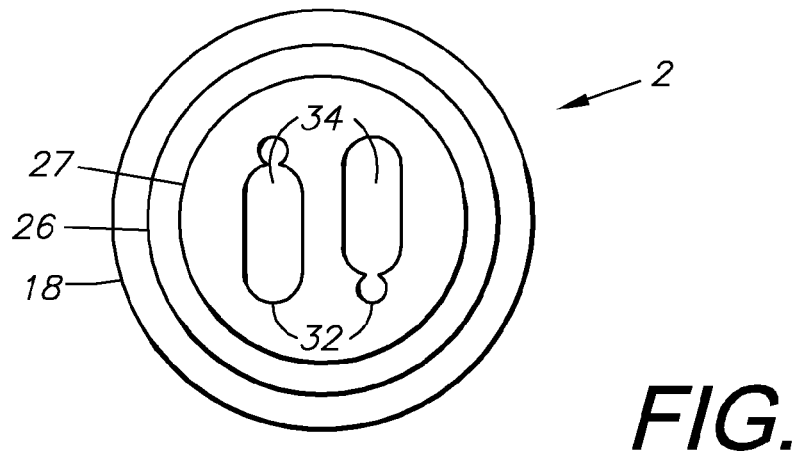
FIG. 3C is a bottom view of the push plug.
Figure 4:
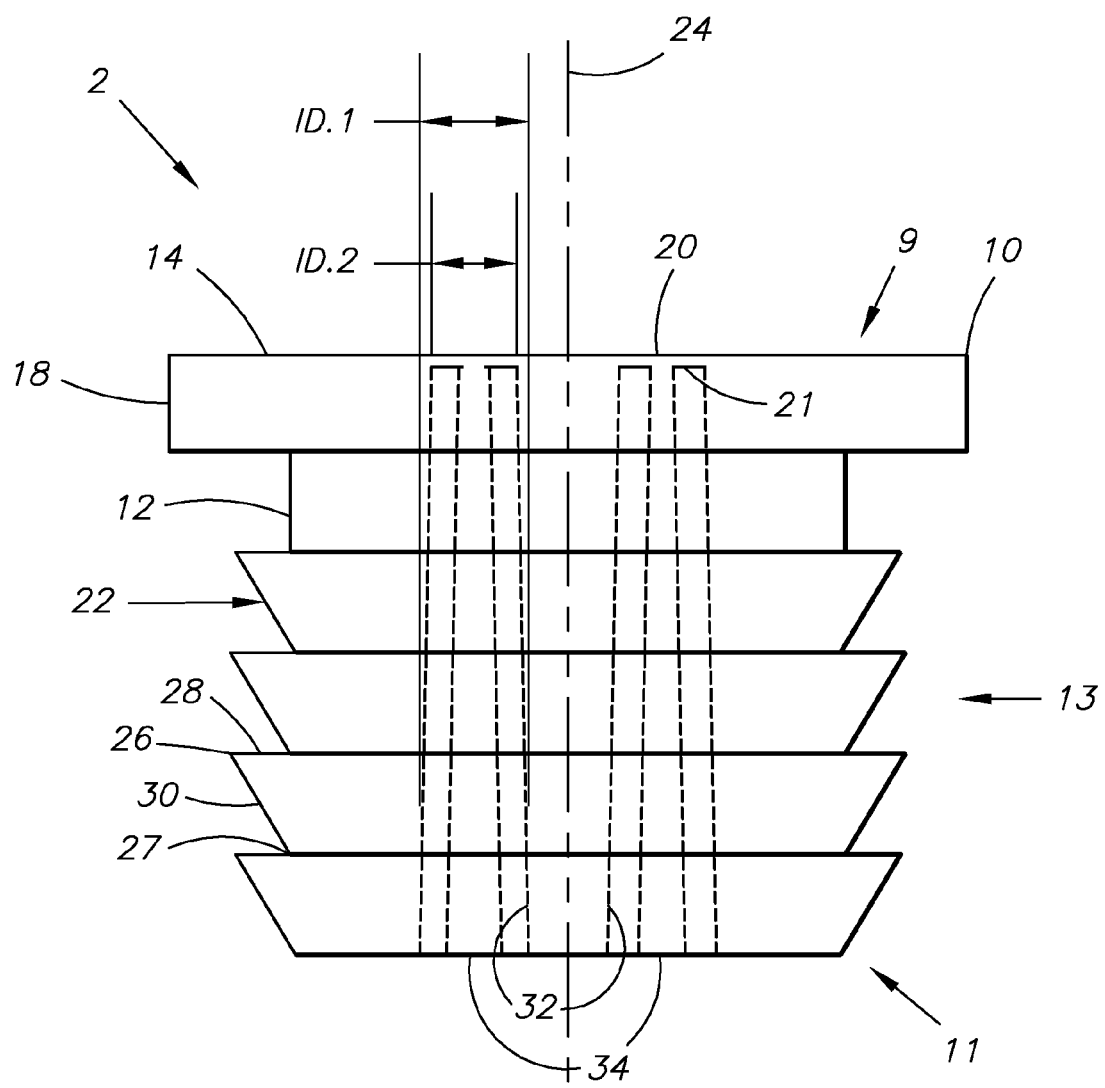
FIG. 4 is an enlarged side elevational view of the push plug.

FIGS. 1-2 show the plug 2 mounting a cable 4 exiting a circular conduit 6. The plug 2 is installed at the open end 8 of a conduit 6 by either threading the cable 4 into the passage 32 and through the membrane 20, or by wrapping the plug 2 around an in-place cable 4. In situations where the end of a cable 4 is free, the cable 4 can be threaded through the plug 2. Threading the cable 4 into the plug 2 is accomplished by first positioning a knife at the distal end 9 of the plug 2 over the top of a passage 32 and cutting one or more slits in the upper surface 14 and through the membrane 20, no greater than the distal inside diameter ID.2, to allow the cable 4 to pass through. Next, the end of a cable 4 is inserted into the passage 32 at the proximal end 11 and pushed into the inner surface 21 and through the membrane 20 emerging at the distal end 9 of the plug 2. The plug 2 is then slid down the cable 4 and inserted into the open end of a conduit 4 until the lower surface 16 rests flush with the end 8 of the conduit 10 thereby creating a sealing engagement between the plug 2 and conduit 6, and the plug 2 and cable 4.

In situations where a length of cable 4 has been drawn through the opening of the conduit 6 and an end of the cable 4 is not free, the plug 2 can be wrapped around the cable 4 by first creating a cut-line 36. A plug is first prepared by making a cut-line 36 through the plug 2 longitudinally beginning at either the proximal end 11 or the distal end 9 through to the opposite end at a depth sufficient to penetrate the passage 32 from the lateral edge of the plug 2. A cut is then made in the membrane 20 above the passage 32 as described above. Alternatively, the membrane 20 can be cut first, followed by the cut-line 36. This process can be repeated for additional passages as necessary depending on the number and arrangement of passages 32 of the particular plug 2 in use, and the specific passages 32 desired to be used in a particular application. The plug 2 may then be installed by first orientating the plug 2 so that the proximal end 11 is orientated toward the open end 8 of the conduit 6. Next, the cable 4 is passed laterally into the plug 2 through the cut-line 36 from the side ensuring the cable 4 is orientated properly relative to the passage 32 in the plug 2, and the particular cable 4 used. Once the desired number of cables 4 have been installed, the plug 2 is then slid down the cables 4 into the open end 8 of the conduit 6 as described above.

Figure 13A:
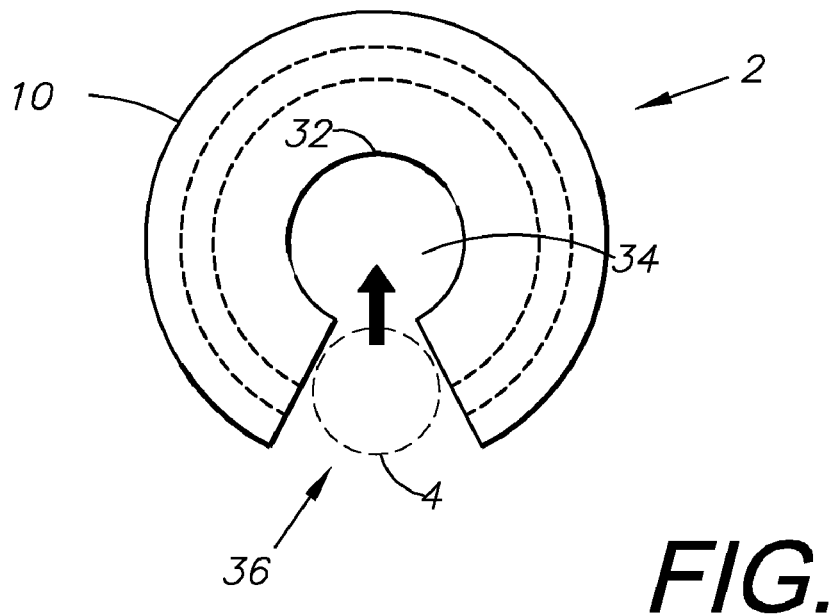
FIG. 13A is a top view of an alternative embodiment of the invention showing a cable being inserted into a plug through a cut slit.
Figure 13B:
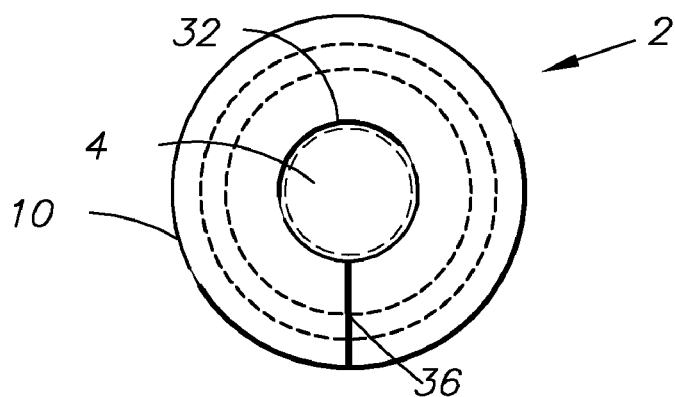
FIG. 13B is a top view of the same, showing the cable fully inserted into the plug through the cut line.

FIGS. 13A and 13B more clearly demonstrate the effect of the cut-line 36 on the plug 2. FIG. 13A demonstrates a cable 4 being forced into the passage 34 through the opening accommodated by the cut-line 36. FIG. 13B demonstrates the plug 2 returning to its original cylindrical shape once the cable 4 has been fully inserted into the passage 34. This method provides an alternative way for a cable 4 to be inserted into a plug 2, after which the plug 2 is placed into the open end of a conduit carrying the cable 4.

IV. Alternative Embodiments

Alternative embodiment push plugs in accordance with the present invention are shown in FIGS. 5A-11C and 14A-15C, having alternative quantity, arrangement and size of passages for particular applications of the aforementioned invention. The alternative embodiment plugs are used in the same manner as described for the plug 2 above. Many of the characteristics and uses of the alternative embodiment push plugs are substantially similar to those described for the push plug 2 described above and are not reiterated below in detail. However, distinguishing features are described below.

Figure 5B:
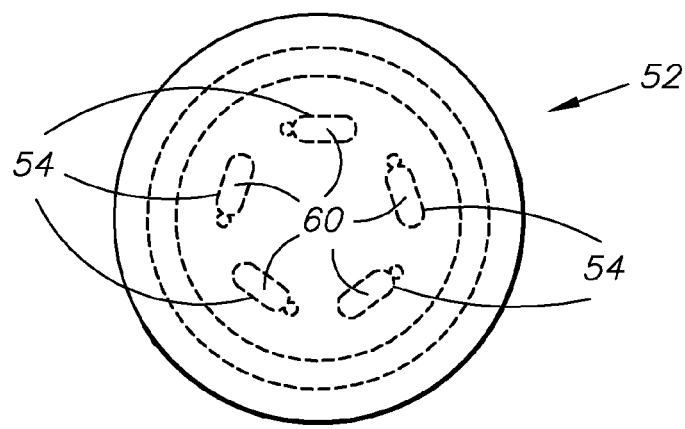
FIG. 5B is a top view of a first alternative embodiment push plug.
Figure 5A:
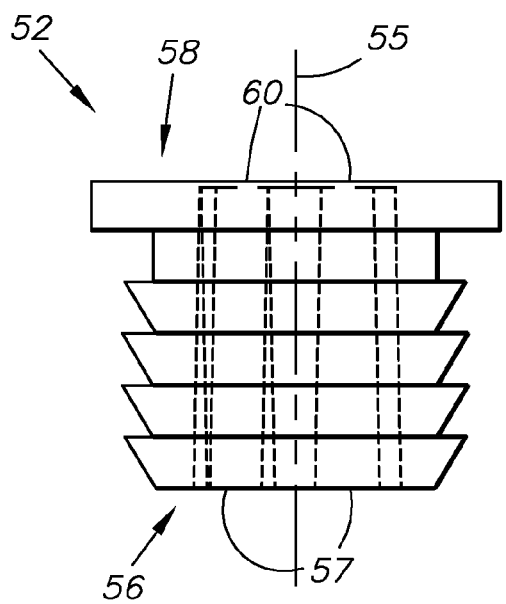
FIG. 5A is a side elevational view of a first alternative embodiment push plug.
Figure 5C:
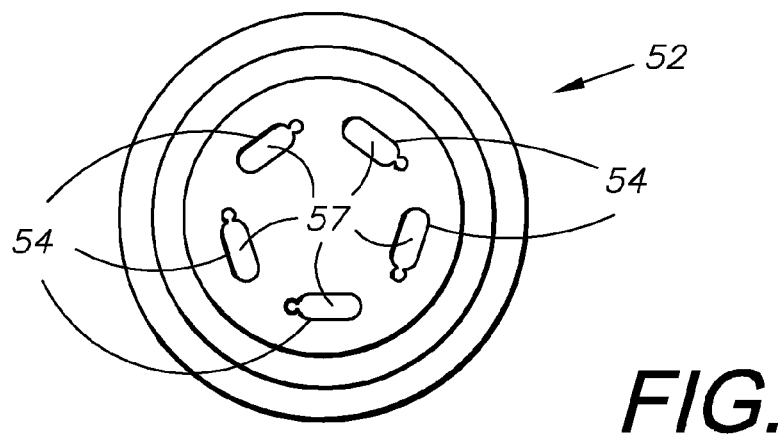
FIG. 5C is a bottom view of a first alternative embodiment push plug.

A first alternative embodiment push plug 52 in accordance with aspects of the present invention is shown in FIGS. 5A-5C, and includes five evenly-spaced passages 54 arranged in a circular array centered on the longitudinal axis 55 and are of a type and shape dimensioned to receive a cable of the ribbon-type for optical fiber. The passages 54 have an opening 57 at the proximal end 56 and taper to a lesser diameter at a membrane 60 sealing the distal end 58.

Figure 6B:
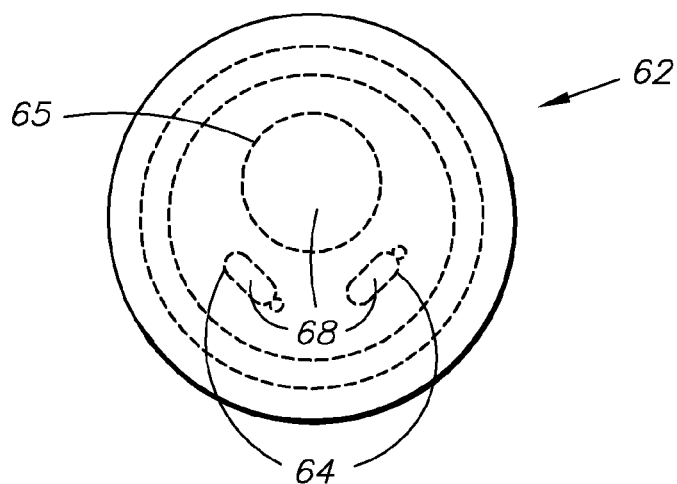
FIG. 6B is a top view of a second alternative embodiment push plug.
Figure 6A:
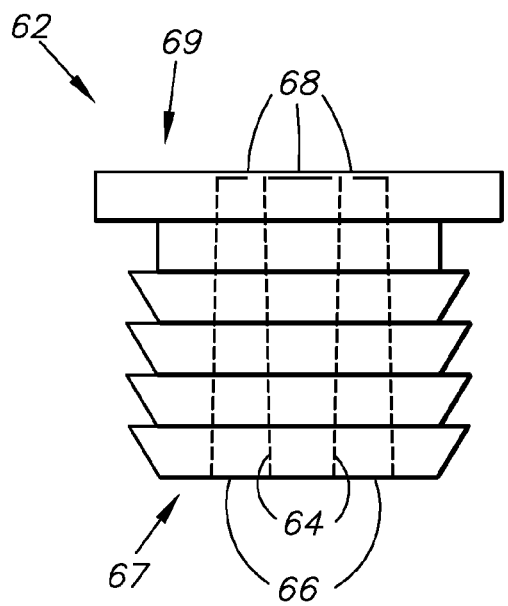
FIG. 6A is a side elevational view of a second alternative embodiment push plug.
Figure 6C:
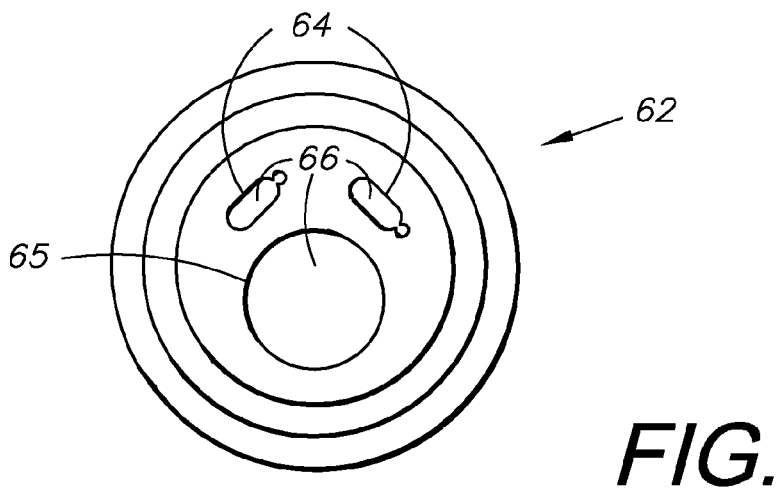
FIG. 6C is a bottom view of a second alternative embodiment push plug.

A second alternative embodiment push plug 62 in accordance with aspects of the present invention is shown in FIGS. 6A-6C, and includes two passages 64 of a type and shape dimensioned to receive a cable of the ribbon-type for optical fiber, and one passage 65 of a type and shape dimensioned to receive a circular cable such as, but not limited to, coaxial cable, multiline cable, optical fiber cable, or copper cables. As above, the passages have an opening 66 at the proximal end 67 and taper to a lesser diameter at a membrane 68 sealing the distal end 69.

Figure 7:
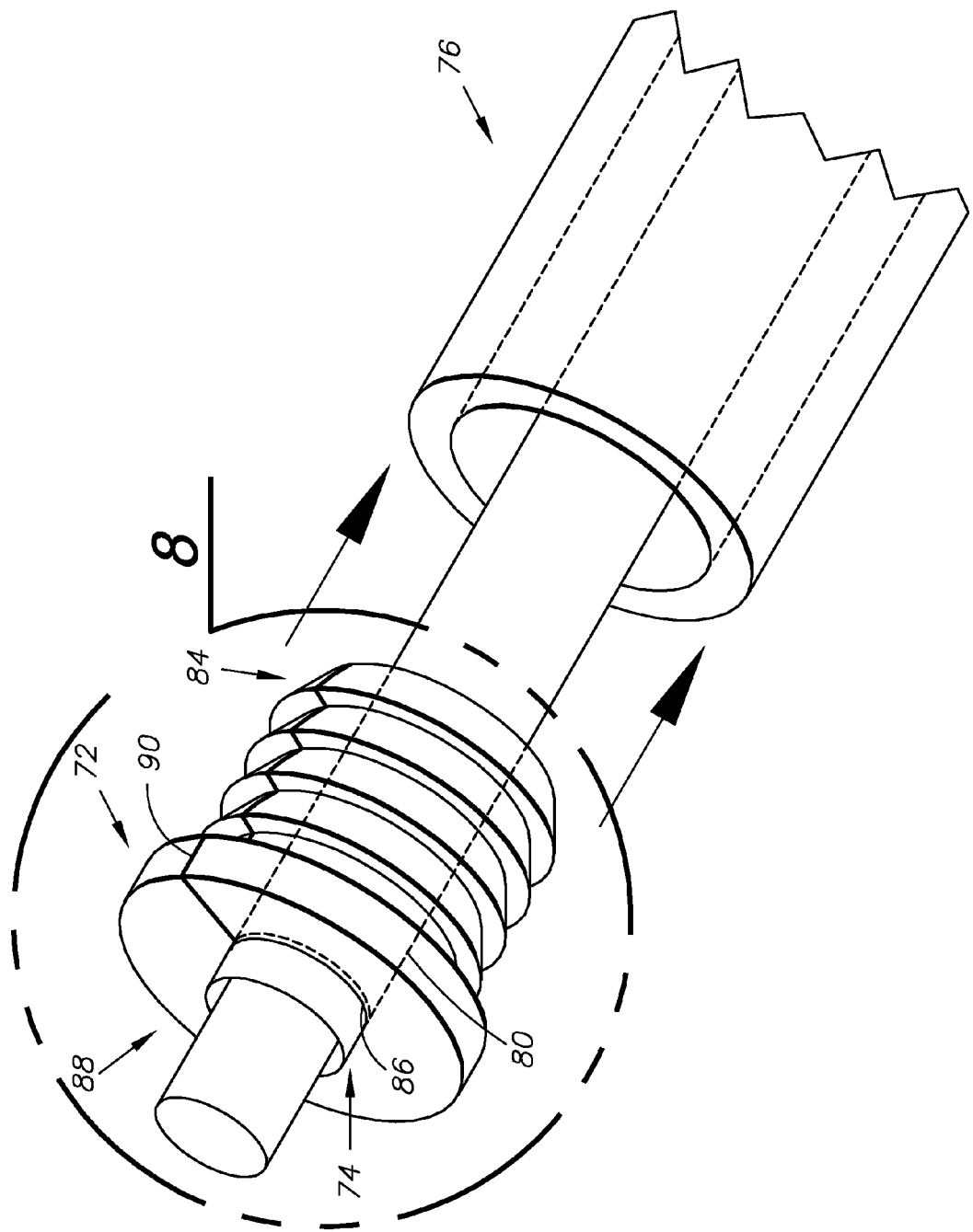
FIG. 7 is an isometric view of a third alternative embodiment push plug.
Figure 9B:
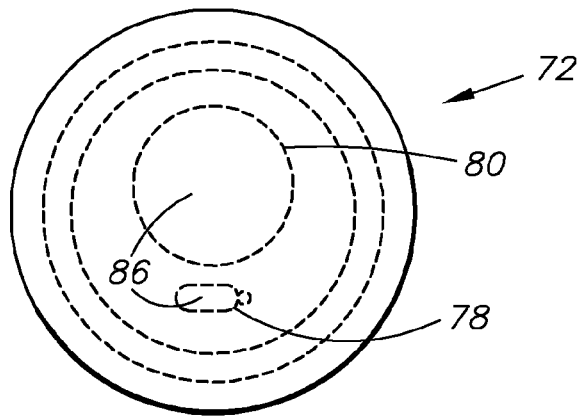
FIG. 9B is a top view of a third alternative embodiment push plug.
Figure 9A:
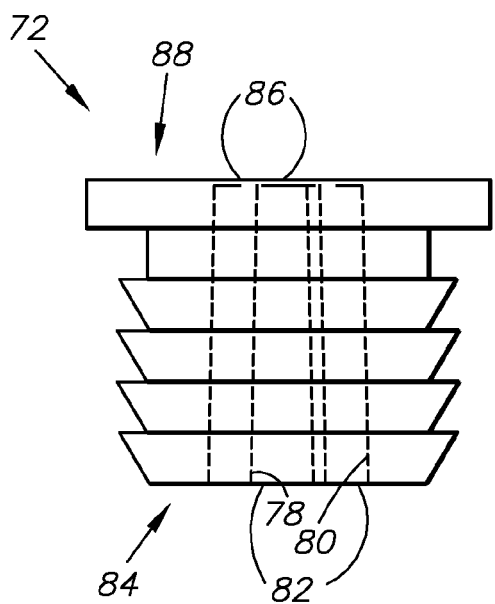
FIG. 9A is a side elevational view of a third alternative embodiment push plug.
Figure 9C:
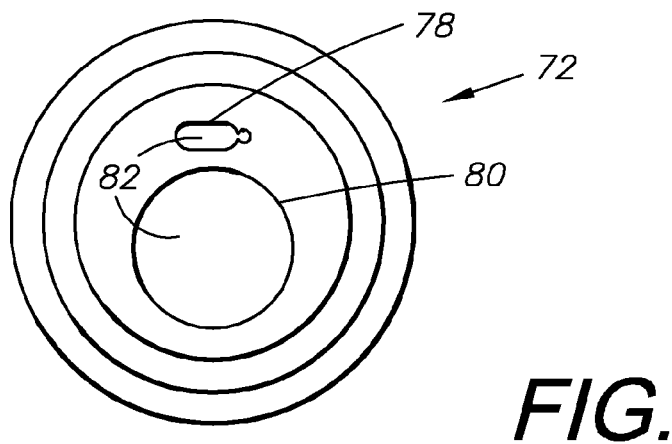
FIG. 9C is a bottom view of a third alternative embodiment push plug.
Figure 10:
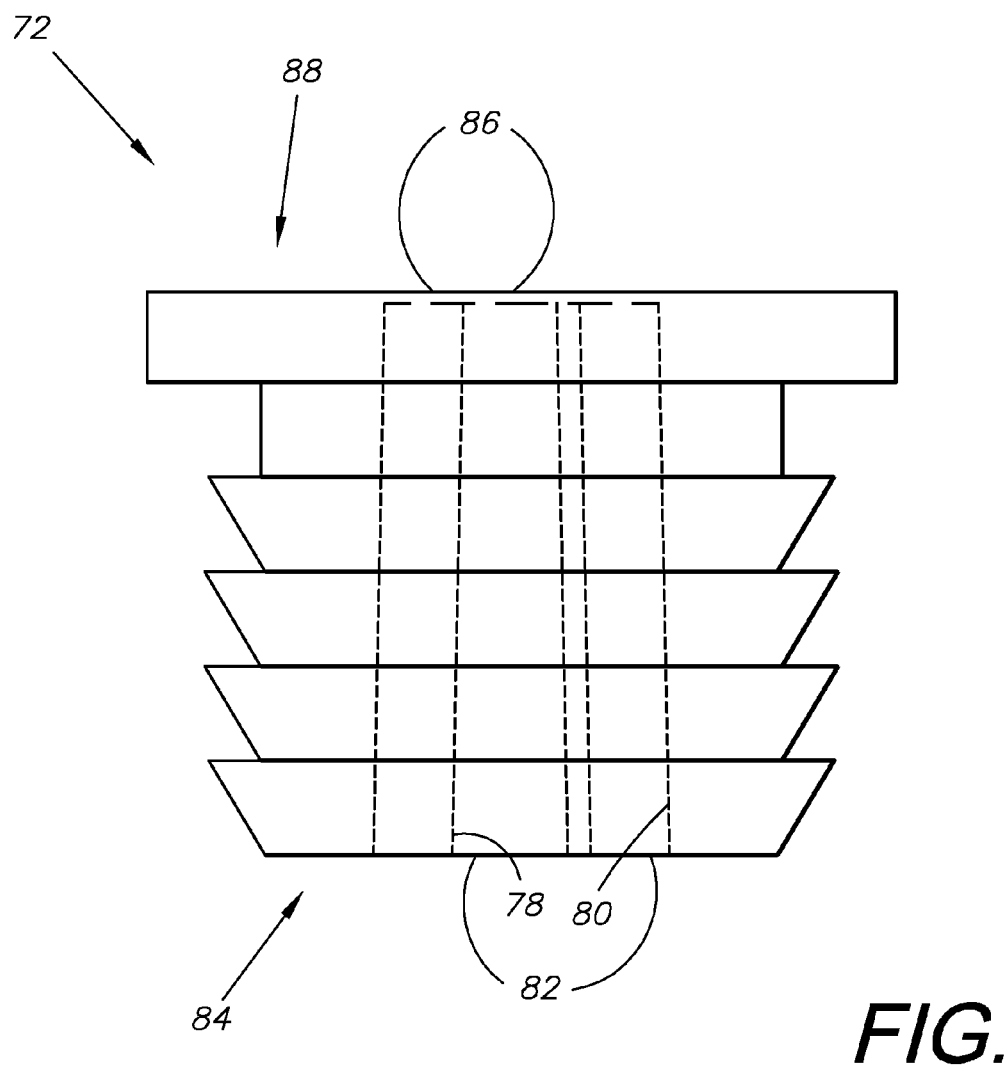
FIG. 10 is an enlarged side elevational view of a third alternative embodiment push plug.

A third alternative embodiment push plug 72 in accordance with aspects of the present invention is shown in FIGS. 7-10. FIG. 7 shows the plug 72 mounting a circular cable 74 within a circular passage 80, and exiting a circular conduit 76. The plug 72 includes one passage 78 of a type and shape dimensioned to receive a cable of the ribbon-type for optical fiber, and one passage 80 of a type and shape dimensioned to receive a circular cable 74 as described above. The passages 78, 80 have an opening 82 at the proximal end 84 and taper to a lesser diameter at a membrane 86 sealing the distal end 88. As described above, the plug 72 can be installed at the end of a conduit 76 by making a cut-line 90 along the length of the plug 72 and through the membrane 86 to pass a cable 74 laterally into the passage 80. Alternatively, a cut can be made in the membrane 86 above a passage 80, and the end of the cable 74 can be inserted into the opening 82 of the circular passage 80 and drawn through membrane 86.

Figure 11B:
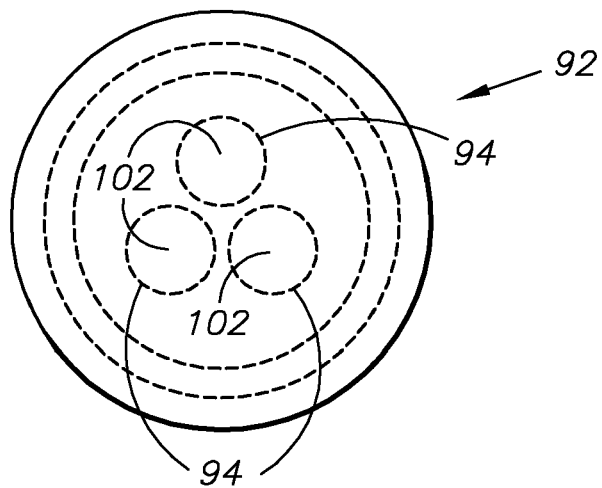
FIG. 11B is a top view of a fourth alternative embodiment push plug.
Figure 11A:
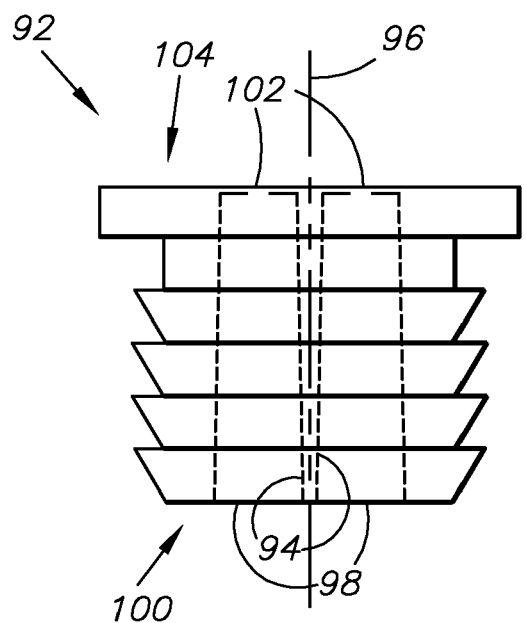
FIG. 11A is a side elevational view of a fourth alternative embodiment push plug.
Figure 11C:
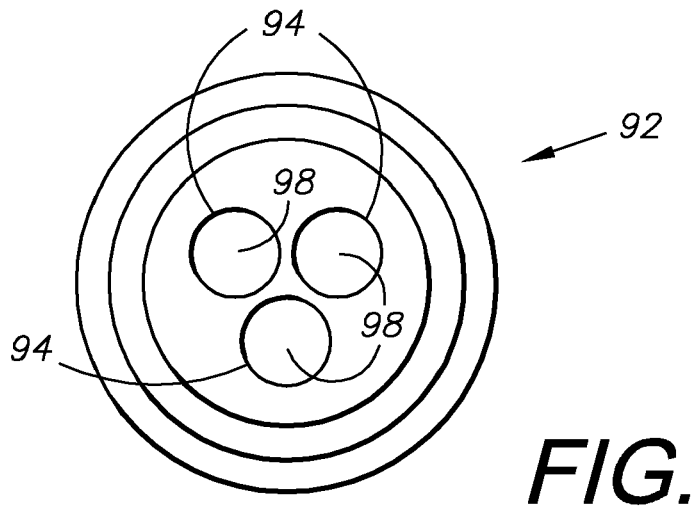
FIG. 11C is a bottom view of a fourth alternative embodiment push plug.

A fourth alternative embodiment push plug 92 in accordance with the present invention is shown in FIGS. 11A-11C, and includes three evenly-spaced passages 94 arranged in a circular array, centered on the longitudinal axis 96, of a type and shape dimensioned to receive a circular cable as described in FIGS. 7-10 above. The passages 94 have an opening 98 at the proximal end 100 and taper to a lesser diameter at a membrane 102 sealing the distal end 104.

Figure 14B:
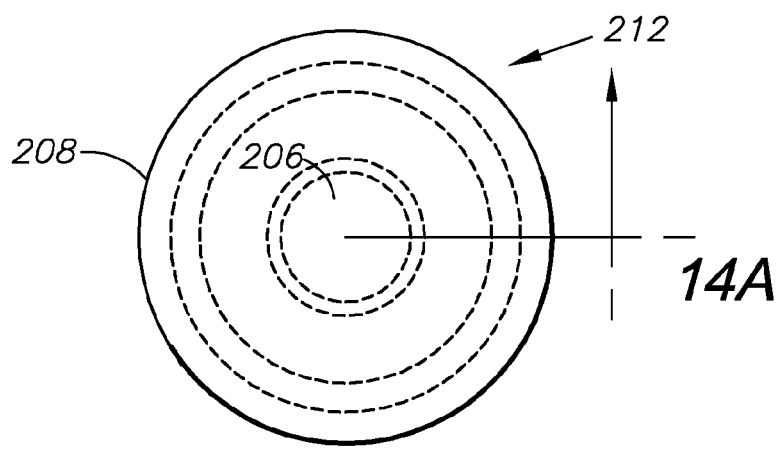
FIG. 14B is a top view of a fifth alternative embodiment push plug.
Figure 14A:
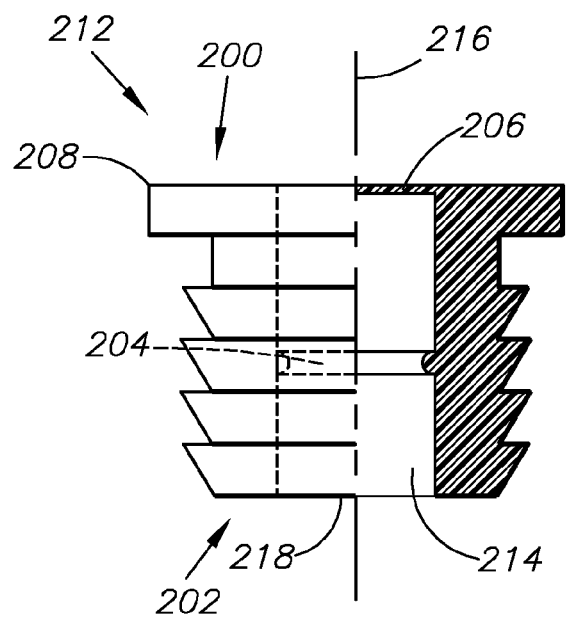
FIG. 14A is a split side elevational and cross sectional view of a fifth embodiment push plug, the cross sectional view along cut-line 14A shown in FIG. 14B.
Figure 14C:
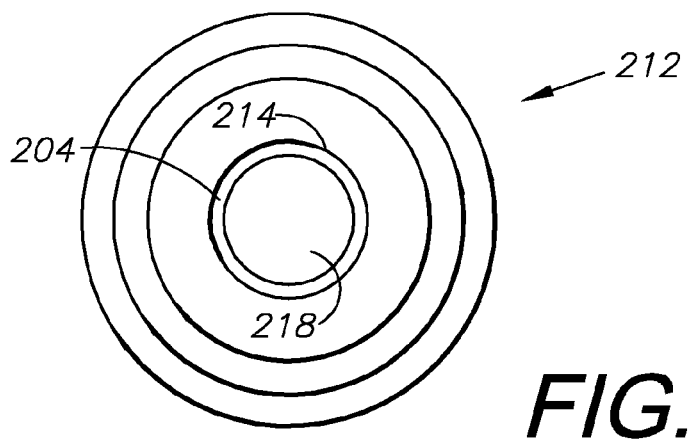
FIG. 14C is a bottom view of a fifth alternative embodiment push plug.

A fifth alternative embodiment push plug 212 in accordance with the present invention is shown in FIGS. 14A-14C, and includes at least one passage 214, here shown centered on the longitudinal axis 216 and of a type and shape dimensioned to receive a circular cable. However, this alternative embodiment can accommodate any size passage and any sized cable proportionate to that passage. The passage 214 has an opening 218 at the proximal end 202 and ends at a membrane 206 sealing the distal end 200. At least one interior rib 204 of diameter less than the diameter of the passage 214 is centrally located within the passage. As a cable 4 is pulled through the opening 218 and into the passage 214 it will come into contact with the internal rib 204. The rib provides a tight seal against the cable 4.

Figure 15B:
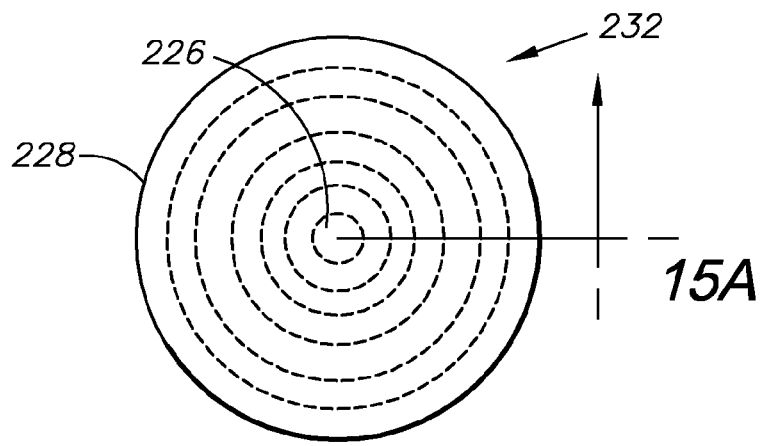
FIG. 15B is a top view of a sixth alternative embodiment push plug.
Figure 15A:
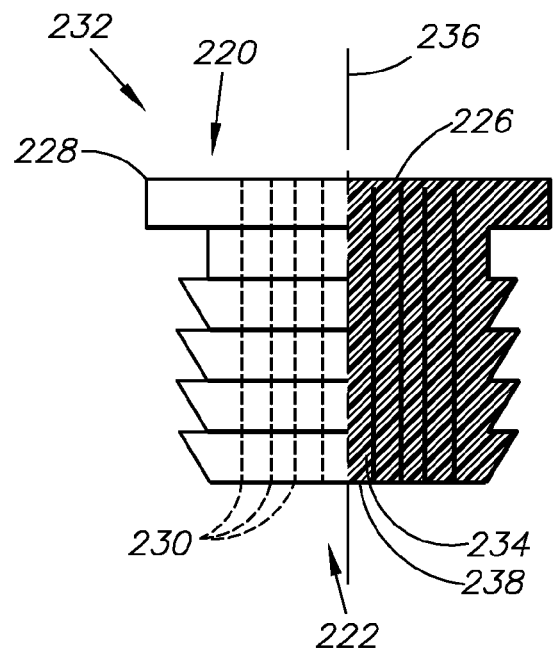
FIG. 15A is a split side elevational and cross sectional view of a sixth embodiment push plug, the cross sectional view along cut-line 15A shown in FIG. 15B.
Figure 15C:
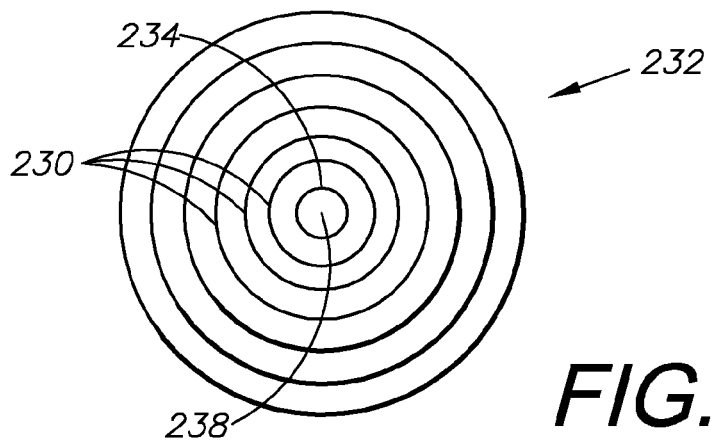
FIG. 15C is a bottom view of a sixth alternative embodiment push plug.

A sixth alternative embodiment push plug 232 in accordance with the present invention is shown in FIGS. 15A-15C. A central passage 234 is located along the longitudinal axis 236 and is a circular shape. A series of concentric, coaxial, cylindrical sections 230 allow the passage 234 to be selectively enlarged to accommodate larger cable types. The passage 234 has an opening 238 at the proximal end 222 and ends at a membrane 226 sealing the distal end 220. The user can selectively remove one or more of the cylindrical sections 230, each expanding the diameter of the opening 238 and the passage 234, accommodating larger cable types.

It will be appreciated that the embodiments of the aforementioned plugs can be used for various other applications. Moreover, the plugs can be fabricated in various sizes, having different arrangements and sizes of passages, and from a wide range of suitable materials, using various manufacturing and fabrication techniques.

V. Manufacture

Figure 12A:
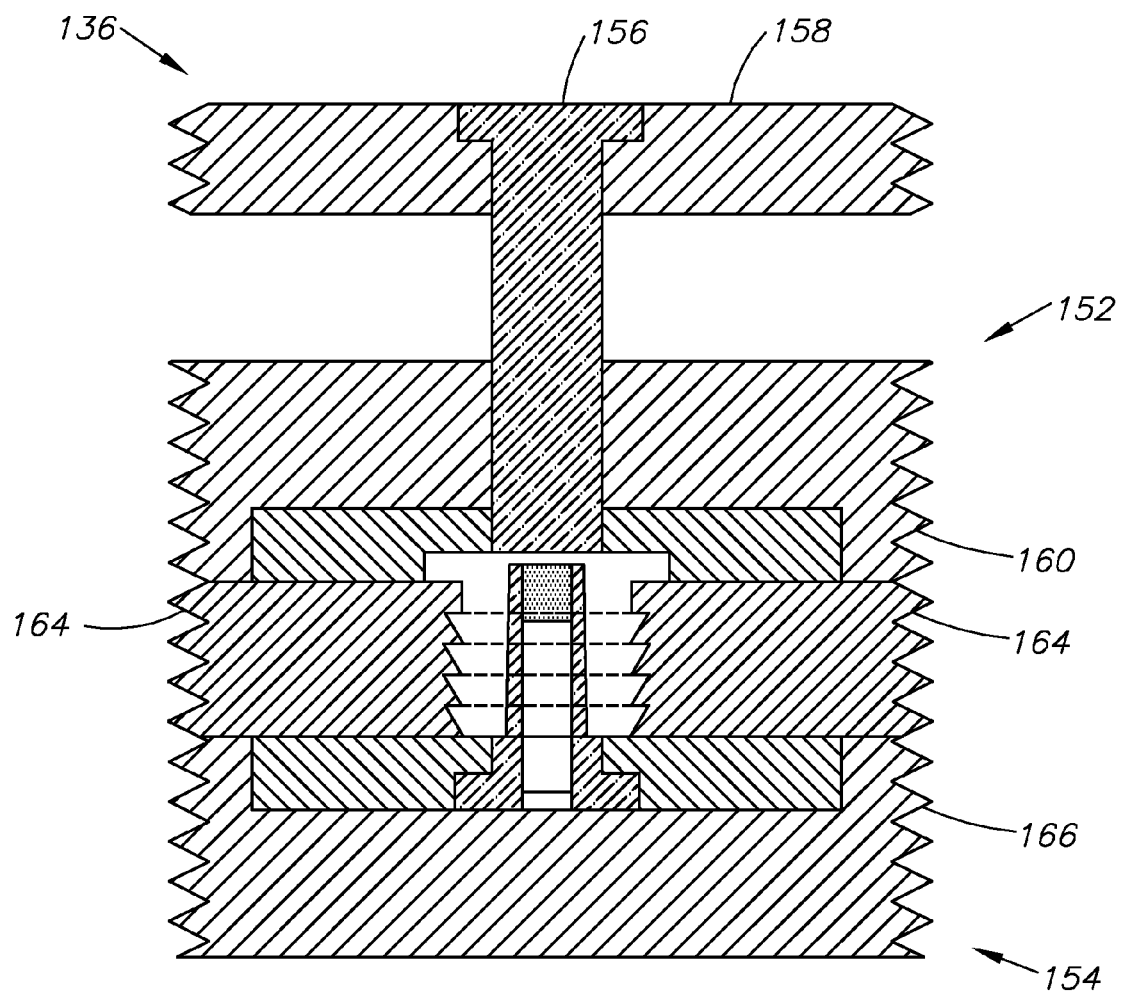
FIG. 12A is a cross-sectional view of the manufacturing method of an embodiment of the push plug of the present invention with the tooling in a closed and forming position.
Figure 12C:
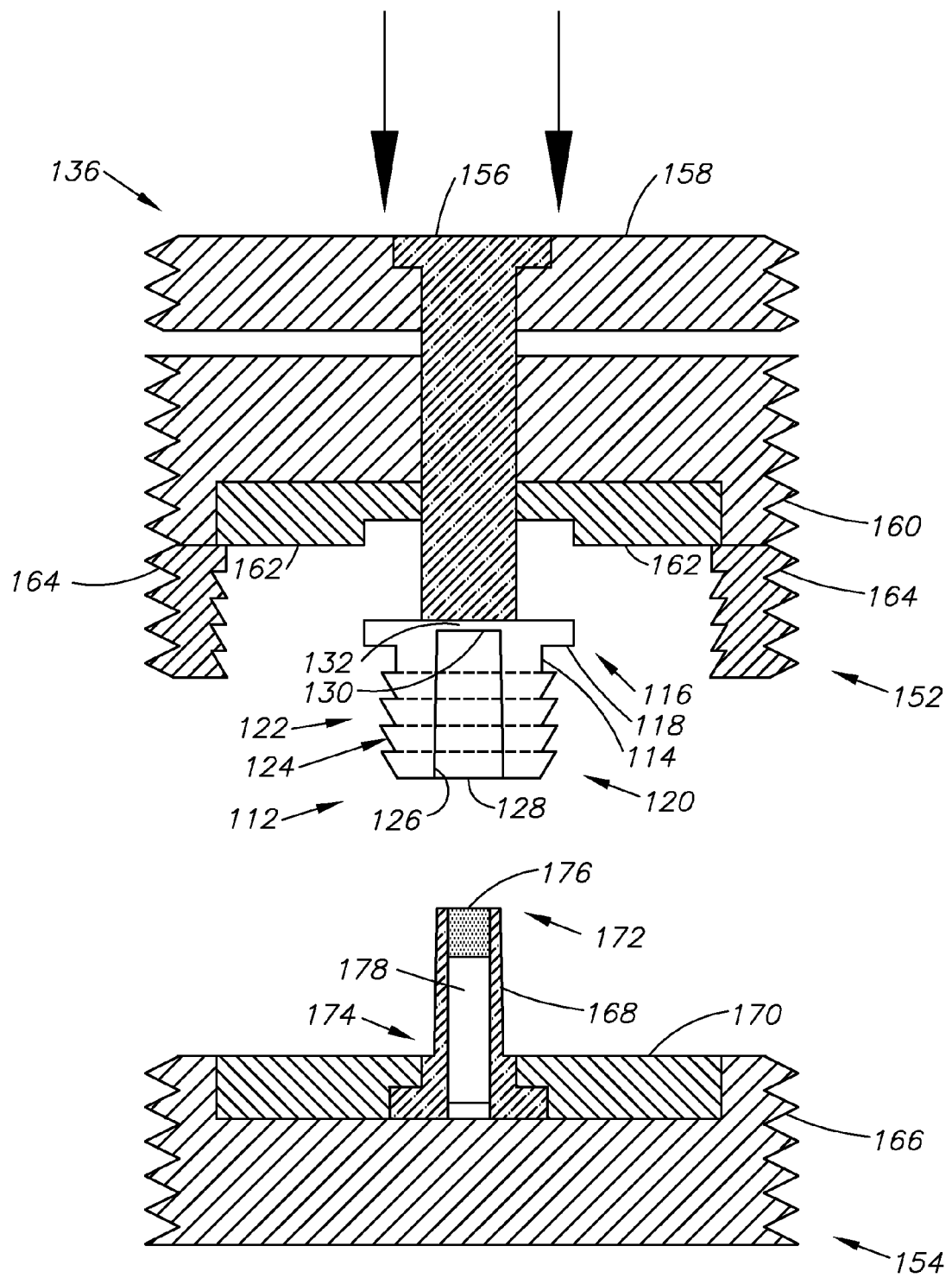
FIG. 12C is a cross-section view of the manufacturing method with the tooling in a position releasing the plug.

The push plug 2, and all alternative embodiments above are manufactured using the method described below. FIGS. 12A-12C show the manufacturing method for an exemplary embodiment circular plug 112. As previously described, the plug 112 consists of a neck 114 disposed between a distal end 116 having a cap 118, and a proximal end 120 having a body 122 containing a plurality of annular, sawtooth-shaped ridges 124 as described above. The plug 112 has a passage 126 with an opening 128 at the proximal end 120 tapering to an inner surface 130 of the membrane 132 at the distal end 116.

Referring to the drawings in more detail, FIG. 12A shows the plug 112 formed within a forming tool 136. The components of the forming tool 136 are manufactured from steel and consist of first and second halves 152, 154. The first half 152 consists of an ejector pin 156 perpendicularly disposed within an ejector plate 158. The ejector pin 156 is slidably received within a tool base 160 and head insert 162. Opposing slide halves 164 are slidably disposed parallel to the tool base 160. The second half 154 consists of a core pin 168 orientated toward the first half 152, having a tip 172 tapering to a wider diameter at a base 174 disposed within a core insert 170, both of which are disposed within the tool base 166. The core pin 168 is an elongated, substantially hollow structure having a plug 176 disposed at the tip 172 with a passage 178 extending between the end of the plug 174 and the base 174. The plug 176 consists of a permeable metal having a porosity sufficient to permit passage of air but prohibit passage of heated elastomeric material. The passage 178 exits the tool 136 along the base of the core pin 168 and vents to the atmosphere.

With the tool 136 in a closed position (FIG. 12A), the periphery of a an enclosed cavity is defined by the inner surfaces of the core insert 170, sawtooth-shaped inner relief of the slides 164, head insert 162, and an ejector pin 156. A volume of the cavity is displaced by the presence of one or more core pins 168 residing therein. The quantity, arrangement, and dimensions of the core pins 168 are determined by the particular characteristics of the cable that is to reside in the passage 126 formed in the plug 112. The distance between the tip 172 of the core pin 168 above the core insert 170 is less than the distance between the surface of the core insert 170 and the surface defined by the interface of the ejector pin 156 and head insert 162.

The plug 112 is formed by injecting, under pressure, heated elastomeric material, preferably PVC, into the plug-shaped cavity through ports (not shown) at the edge of the core insert 170. During operation, the metallic components of the first and second halves 152, 154 of the tool 136 are cooled to permit curing of the heated elastomeric material. As the material is injected into the cavity, it substantially fills the cavity within the tool 136 surrounding the core pin 168. Material accumulates within the entire volume of the cavity including the space created by the separation between the tip 172 of the core pin 168, and the interface created by the ejector pin 156 and head insert 162. Pressure created by injection of material into the closed cavity displaces air within the cavity that is vented from the tool 136 through the plug 172 and out the passage 178. Providing a plug 176 and passage 178 for discharge of trapped air allows the elastomeric material to substantially fill the cavity including the space between the tip 172 of the core pin 168, and the inner surface of the ejector pin 156 and head insert 162. The material that fills the aforementioned space forms the membrane 132 of the plug 112.

After curing of the injected material, the plug 112 is disengaged from the tool 136 by first separating the first half 152 from the second half 154 (FIG. 12B). The opposing slides 164 are drawn laterally away from the plug 112 either concurrently with the separation of the halves 152, 154, or shortly after the core pin 168 is drawn out of the passage 126. After separation of the halves, the plug 112 is separated from contact with the head insert 162 by sliding the ejector pin 156 and ejector plate 158 toward the second half 154 while the remaining components of the first and second halves 152, 154 remain static. Once the plug 112 is free of the components of both the first and second halves 152, 154, the tool 136 is returned to the starting position in FIG. 12A and formation of another plug 112 may begin.

It is to be understood that while certain aspects of the invention have been shown and described, the invention is not limited thereto and encompasses various other embodiments and aspects.

Having thus described the invention, what is claimed as new and desired to be secured by Letters Patent is:

1. A push plug for sealing an open end of a cable-carrying conduit, comprising:
   a distal end, a proximal end, a neck, a body, and a cap aligned along a longitudinal axis;
   said neck disposed between said cap at a distal end and said body at a proximal end;
   said plug proximal and distal ends, the proximal plug end being adapted for insertion into the conduit open end;
   said plug body including an annular ridge adapted for forming a seal with the conduit and resisting removal from the conduit;
   a cable passage extending from and open at the proximal end towards the distal end;
   a cap at said plug distal end, said cap including a membrane with a closed, intact configuration closing the passage and a penetrated configuration penetrated by the cable;
   said membrane in the closed configuration providing a substantially fluid-tight seal of the passage at the plug cap;
   said plug passage being adapted to receive the cable in the penetrated-membrane configuration with the cable extending through the membrane and the membrane forming a substantially fluid-tight seal between the cable and the plug; and
   wherein said passage comprises two oblong rounded-rectangle passages tapering from a larger opening at the proximal end to a smaller opening at the distal end, two circular passages running alongside said two oblong passages, the circular passages including a distal diameter D1 and a proximal diameter D2, wherein diameter D1 is less than diameter D2, and each circular passage partially opening into the space created by said oblong passage.

2. The push plug according to claim 1, wherein:
   said plug is form-molded from an elastomeric material comprising one of rubber, silicone and plastic; and
   said plug membrane is adapted for stretching over inserted cable.

3. The push plug according to claim 1, which includes a plurality of said annular ridges with saw-toothed configurations.

4. The plug according to claim 1 in which said cap, neck, and body are manufactured from an elastomeric material.

5. The plug of claim 4 wherein said elastomeric material consists of flexible polyvinyl chloride (PVC).

6. The plug according to claim 1, including:
a slit extending longitudinally from the plug distal end to the plug proximal end and penetrating to the depth of the passage; wherein said slit is adapted for accepting cables lengthwise while the plug is separated from the conduit, and sealing said cable into said passage when the plug is inserted into an open end of said conduit.

7. The plug of claim 1 wherein said passage is dimensioned to receive a cable, said cable including, but not limited to ribbon cable, oval cable, or circular cable.

8. The plug of claim 1 wherein said body includes multiple passages, each adapted for receiving and sealing multiple said cables.

9. A push plug for sealing an open end of a cable-carrying conduit, comprising:
a distal end, a proximal end, a neck, a body, and a cap aligned along a longitudinal axis;
said neck disposed between said cap at a distal end and said body at a proximal end;
said plug proximal and distal ends, the proximal plug end being adapted for insertion into the conduit open end;
said plug body including an annular ridge adapted for forming a seal with the conduit and resisting removal from the conduit;
a cable passage extending from and open at the proximal end towards the distal end;
a cap at said plug distal end, said cap including a membrane with a closed, intact configuration closing the passage and a penetrated configuration penetrated by the cable;
said membrane in the closed configuration providing a substantially fluid-tight seal of the passage at the plug cap;
said plug passage being adapted to receive the cable in the penetrated-membrane configuration with the cable extending through the membrane and the membrane forming a substantially fluid-tight seal between the cable and the plug; and
wherein said passage comprises a plurality of circumferentially spaced passages around the longitudinal axis of said plug body, said passages comprising oblong rounded-rectangle passages tapering from a larger opening at the proximal end to a smaller opening at the distal end, a circular passage running alongside each of said plurality of oblong passages, the circular passages including a distal diameter D1 and a proximal diameter D2, wherein diameter D1 is less than diameter D2, and each circular passage partially opening into the space created by said oblong passage.

10. The push plug according to claim 9, wherein:
said plug is form-molded from an elastomeric material comprising one of rubber, silicone and plastic; and
said plug membrane is adapted for stretching over inserted cable.

11. The push plug according to claim 9, which includes a plurality of said annular ridges with saw-toothed configurations.

12. The plug according to claim 9 in which said cap, neck, and body are manufactured from an elastomeric material.

13. The plug according to claim 9, including:
a slit extending longitudinally from the plug distal end to the plug proximal end and penetrating to the depth of the passage; wherein said slit is adapted for accepting cables lengthwise while the plug is separated from the conduit, and sealing said cable into said passage when the plug is inserted into an open end of said conduit.

14. The plug of claim 13 wherein said elastomeric material consists of flexible polyvinyl chloride (PVC).

15. The plug of claim 9 wherein said passage is dimensioned to receive a cable, said cable including, but not limited to ribbon cable, oval cable, or circular cable.

16. The plug of claim 9 wherein said body includes multiple passages, each adapted for receiving and sealing multiple said cables.

17. A push plug for sealing an open end of a cable-carrying conduit, comprising:
a distal end, a proximal end, a neck, a body, and a cap aligned along a longitudinal axis;
said neck disposed between said cap at a distal end and said body at a proximal end;
said plug proximal and distal ends, the proximal plug end being adapted for insertion into the conduit open end;
said plug body including an annular ridge adapted for forming a seal with the conduit and resisting removal from the conduit;
a cable passage extending from and open at the proximal end towards the distal end;
a cap at said plug distal end, said cap including a membrane with a closed, intact configuration closing the passage and a penetrated configuration penetrated by the cable;
said membrane in the closed configuration providing a substantially fluid-tight seal of the passage at the plug cap;
said plug passage being adapted to receive the cable in the penetrated-membrane configuration with the cable extending through the membrane and the membrane forming a substantially fluid-tight seal between the cable and the plug; and
wherein said passage comprises a prominent circular passage including a distal diameter D1 and a proximal diameter D2, wherein diameter D1 is less than diameter D2, two oblong rounded-rectangle passages tapering from a larger opening at the proximal end to a smaller opening at the proximal end, two secondary circular passages running alongside said two oblong passages, the circular passages including a distal diameter D1 and a proximal diameter D2, wherein diameter D1 is less than diameter D2, and each of said secondary circular passages partially opening into the space created by said oblong passage.

18. The push plug according to claim 17, wherein:
said plug is form-molded from an elastomeric material comprising one of rubber, silicone and plastic; and
said plug membrane is adapted for stretching over inserted cable.

19. The push plug according to claim 17, which includes a plurality of said annular ridges with saw-toothed configurations.

20. The plug according to claim 17 in which said cap, neck, and body are manufactured from an elastomeric material.

21. The plug according to claim 17, including:
a slit extending longitudinally from the plug distal end to the plug proximal end and penetrating to the depth of the passage; wherein said slit is adapted for accepting cables lengthwise while the plug is separated from the conduit, and sealing said cable into said passage when the plug is inserted into an open end of said conduit.

22. The plug of claim 21 wherein said elastomeric material consists of flexible polyvinyl chloride (PVC).

23. The plug of claim 17 wherein said passage is dimensioned to receive a cable, said cable including, but not limited to ribbon cable, oval cable, or circular cable.

24. The plug of claim 17 wherein said body includes multiple passages, each adapted for receiving and sealing multiple said cables.

25. A push plug for sealing an open end of a cable-carrying conduit, comprising:
- a distal end, a proximal end, a neck, a body, and a cap aligned along a longitudinal axis;
- said neck disposed between said cap at a distal end and said body at a proximal end;
- said plug proximal and distal ends, the proximal plug end being adapted for insertion into the conduit open end;
- said plug body including an annular ridge adapted for forming a seal with the conduit and resisting removal from the conduit;
- a cable passage extending from and open at the proximal end towards the distal end;
- a cap at said plug distal end, said cap including a membrane with a closed, intact configuration closing the passage and a penetrated configuration penetrated by the cable;
- said membrane in the closed configuration providing a substantially fluid-tight seal of the passage at the plug cap;
- said plug passage being adapted to receive the cable in the penetrated-membrane configuration with the cable extending through the membrane and the membrane forming a substantially fluid-tight seal between the cable and the plug; and
- wherein said passage comprises a prominent circular passage including a distal diameter D1 and a proximal diameter D2, wherein diameter D1 is less than diameter D2, an oblong rounded-rectangle passages tapering from a larger opening at the proximal end to a smaller opening at the proximal end, a secondary circular passage running alongside said two oblong passages, the circular passages including a distal diameter D1 and a proximal diameter D2, wherein diameter D1 is less than diameter D2, and said secondary circular passage partially opening into the space created by said oblong passage.

26. The push plug according to claim 25, wherein:
- said plug is form-molded from an elastomeric material comprising one of rubber, silicone and plastic; and
- said plug membrane is adapted for stretching over inserted cable.

27. The push plug according to claim 25, which includes a plurality of said annular ridges with saw-toothed configurations.

28. The plug according to claim 25 in which said cap, neck, and body are manufactured from an elastomeric material.

29. The plug according to claim 25, including:
- a slit extending longitudinally from the plug distal end to the plug proximal end and penetrating to the depth of the passage; wherein said slit is adapted for accepting cables lengthwise while the plug is separated from the conduit, and sealing said cable into said passage when the plug is inserted into an open end of said conduit.

30. The plug of claim 29 wherein said elastomeric material consists of flexible polyvinyl chloride (PVC).

31. The plug of claim 25 wherein said passage is dimensioned to receive a cable, said cable including, but not limited to ribbon cable, oval cable, or circular cable.

32. The plug of claim 25 wherein said body includes multiple passages, each adapted for receiving and sealing multiple said cables.

* * * * *